(12) United States Patent
Haring

(10) Patent No.: US 8,482,848 B2
(45) Date of Patent: Jul. 9, 2013

(54) SATURABLE ABSORBER MIRROR

(75) Inventor: Reto Haring, Munich (DE)

(73) Assignee: Toptica Photonics AG (DE)

( * ) Notice: Subject to any disclaimer, the term of this patent is extended or adjusted under 35 U.S.C. 154(b) by 654 days.

(21) Appl. No.: 12/635,427

(22) Filed: Dec. 10, 2009

(65) Prior Publication Data

US 2010/0150198 A1    Jun. 17, 2010

(30) Foreign Application Priority Data

Dec. 11, 2008  (DE) .......................... 10 2008 061 335

(51) Int. Cl.
*H01S 3/00*   (2006.01)

(52) U.S. Cl.
USPC ...................................... 359/333; 372/45.013

(58) Field of Classification Search
USPC ................. 359/337, 884; 372/45.013, 49.01, 372/11; 977/755
See application file for complete search history.

(56) References Cited

U.S. PATENT DOCUMENTS

| | | | |
|---|---|---|---|
| 6,898,225 B2* | 5/2005 | Mooradian | 372/43.01 |
| 2006/0029120 A1* | 2/2006 | Mooradian et al. | 372/102 |
| 2009/0296754 A1* | 12/2009 | Ledentsov et al. | 372/20 |

* cited by examiner

*Primary Examiner* — Mark Hellner
(74) *Attorney, Agent, or Firm* — Berliner & Associates

(57) ABSTRACT

The invention relates to a saturable absorber mirror comprised of
a) a rear-side reflector layer (2),
b) an intermediate layer (6), the boundary areas of which form an interference filter,
c) at least one absorber layer arranged within the interference filter and comprised of a material absorbing a light at operating wavelength of the saturable absorber mirror depending on intensity, and
d) a front-side cover layer. It is the object of the invention to provide a saturable absorber mirror having improved properties. To this effect the invention proposes that the interference filter is neither resonant nor anti-resonant at operating wavelength, with the intensity (I) of the electromagnetic stationary wave field of the light in the interior of the cover layer (5) having a local extremum (8).

17 Claims, 2 Drawing Sheets

SATURABLE ABSORBER MIRROR

Figure 1:
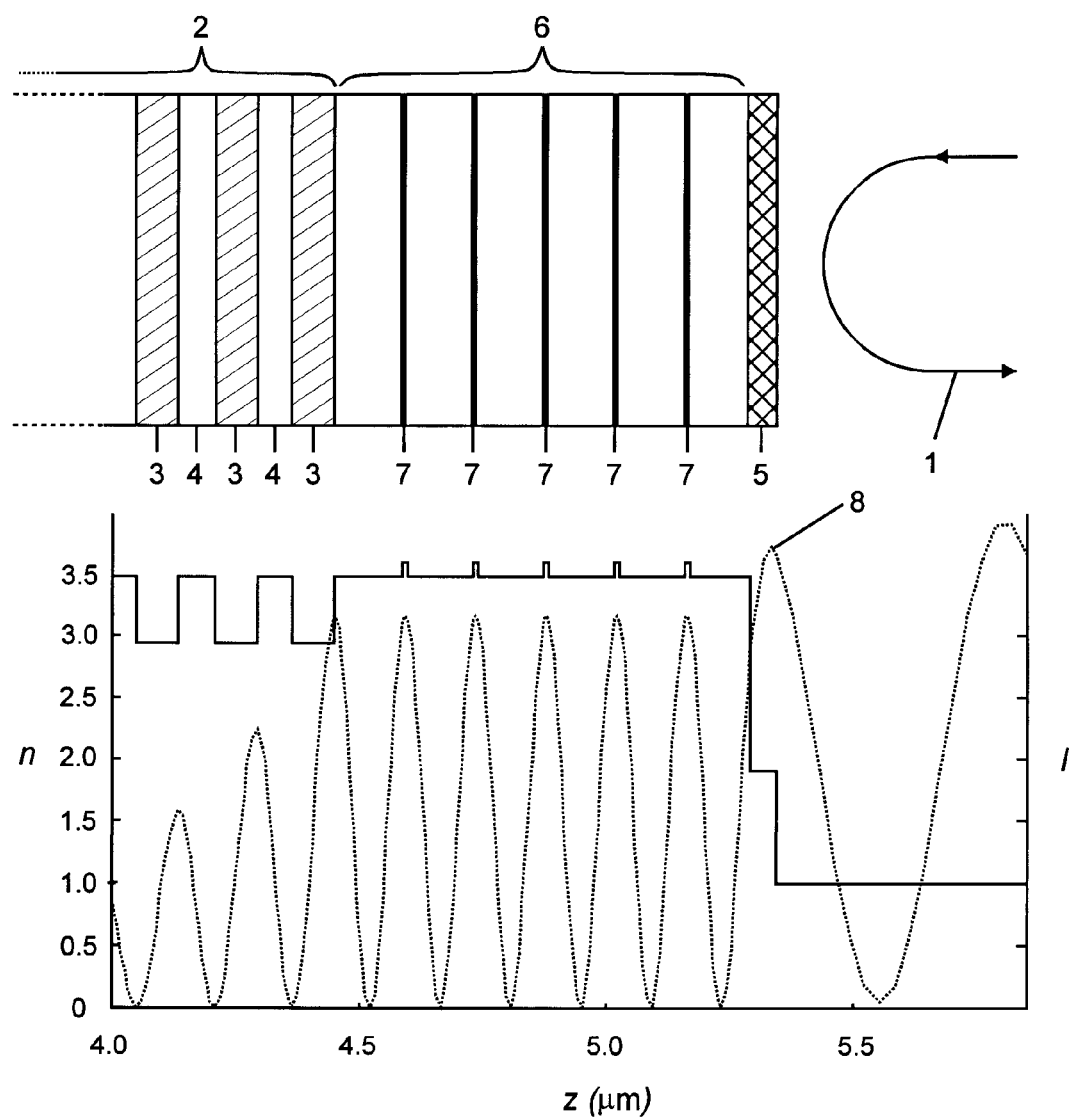

The invention relates to a saturable absorber mirror comprised of
- a) a rear-side reflector layer,
- b) an intermediate layer, the boundary areas of which form an interference filter,
- c) at least one absorber layer arranged within the interference filter and comprised of a material absorbing a light at operating wavelength of the saturable absorber mirror depending on intensity, and
- d) a front-side cover layer.

Saturable absorbers are optical components which partly absorb irradiated light. The absorption intensity depends on the intensity of the irradiated light. With high light intensities, absorption becomes weaker. Various types of materials absorbing depending on intensity are known. For example, saturable absorption may occur in a medium doped with ions which are resonantly excited by the irradiated light. A high light intensity causes depletion of ions existing in electronic ground state and thus it causes a decrease of absorption. Similar effects may occur in semiconductors in which the irradiated light excites transition of electrons from the valence into the conduction band. A reduction of the occupation of the valence band causes a decreased absorption at wavelengths in the area of the band gap.

Saturable absorbers are applied as mode coupling elements and quality switching elements in lasers to generate short (or ultra-short) light pulses.

Furthermore, saturable absorbers are utilized for filtration and regeneration of optical data signals.

Various types of saturable absorbers are known from prior art. Saturable absorber mirrors are mostly applied as mode coupling elements for lasers to generate light pulses. Saturable absorber mirrors produced on the basis of semiconductor substrates are also designated as SESAM. This abbreviation stands for "Semiconductor Saturable Absorber Mirror".

Typically, a SESAM is comprised of a Bragg mirror mounted on a semiconductor substrate as a rear-side reflector layer. For example, such a Bragg mirror is generated by epitactical growth of alternating AlAs and GaAs layers on a GaAs substrate. Applied onto the reflector layer is an intermediate layer, the boundary areas of which form an interference filter (e.g. a Fabry-Perot etalon). In some conventional SESAM structures, a boundary area of the Fabry-Perot etalon is the transition between the semiconductor material and air, with a Fresnel reflection occurring at this transition. Towards the irradiated light, the material of the intermediate layer is mainly transparent. Arranged within the interference filter is the actual absorber layer which absorbs the irradiated light at the operating wavelength of the saturable absorber mirror depending on intensity. For example, the absorber layer may be a quantum well comprised of InGaAs which is also produced by epitaxy on the GaAs substrate. The position of the absorber layer within the interference filter crucially determines the properties of the saturable absorber mirror. For these depend on the intensity of the standing wave field of the irradiated light within the interference filter at the site of the absorber layer. For example, these properties are the modulation depth, i.e. the maximum change of absorption depending on intensity, as well as the saturation fluence, i.e. the specific energy of the irradiated light which is required to trigger a switching procedure, i.e. the desired reduction of absorption. Another significant parameter is the decay time which indicates how fast absorption responds to changes in the intensity of the irradiated light. However, the decay time is mainly determined by the material of the absorber layer and less by the structural set-up of the saturable absorber mirror.

It is furthermore known from prior art to provide a cover layer at the front side of the saturable absorber mirror, i.e. as the uppermost layer which, for example, can configure a partly permeable mirror or merely serves for passivating, i.e. for protection of the Fabry-Perot etalon.

Two fundamentally different types of saturable absorber mirrors are known, viz. anti-resonant and resonant variants. With the anti-resonant variant, the interference filter is anti-resonant, i.e. the optical thickness of the etalon corresponds to an odd multiple of a quarter of the operating wavelength. The anti-resonant design entails various drawbacks for modern laser applications. In general, modulation depth is too low, while saturation fluence is too high. Saturable absorber mirrors with a resonant setup which are also termed LOFERS ("low field enhanced resonant saturable absorber mirror") distinguish themselves by a higher modulation depth and a lower saturation fluence. But in practice, resonant variants are rarely applied because the exploitable bandwidth around the operating wavelength is extremely low. On account of the resonance conditions to be observed, resonant saturable absorber mirrors respond very sensitively to fabrication faults. Another critical issue with resonant saturable absorber mirrors lies in that a maximum of the intensity of the standing wave field develops at the semiconductor surface. Therefore, high light intensities bear the risk of destroying the surface, more particularly if pollutants and/or contaminants accumulate at the surface, e.g. in form of diffusing arsenic or oxides. With resonant saturable absorber mirrors, cover layers that cause an elimination of reflection of the surface are partly used. Though the mirror thus attains more bandwidth, the benefit of reduced saturation fluence with resonant structures is thereby rendered null and void.

A saturable absorber mirror of the initially described type is known from U.S. Pat. No. 8,828,219 B2, for example.

Against the background of the prior art in technology as outlined hereinabove, it is the object of the present invention to provide a saturable absorber mirror in which the drawbacks of anti-resonant and resonant variants are eliminated as far as possible. In particular, manufacture of the absorber mirror shall be less critical in terms of fabrication tolerances. At comparably little expenditure, it shall be possible to adapt a saturable absorber mirror on manufacture to a pre-defined operating wavelength.

On the basis of a saturable absorber mirror of the type mentioned initially hereinabove, this task is solved by the present invention in that the interference filter is neither resonant nor anti-resonant at operating wavelength, whereas the intensity of the electromagnetic standing wave field of the light in the interior of the cover layer has a local extremum.

Furthermore, this task is solved by a method for adapting a saturable absorber mirror to a pre-defined operating wavelength, in which the saturable absorber mirror at its front side is coated with a cover layer being transparent at the operating wavelength and the thickness of which is so determined that the course of reflectivity depending on the light wavelength is mainly symmetrical to the operating wavelength.

The main finding of the present invention lies in that it is possible at little expenditure to obtain a saturable absorber mirror with suitable properties at the desired operating wavelength by applying a cover layer at the front side, i.e. as the uppermost layer, with the thickness of said cover layer being so chosen that the course of reflectivity depending on the light wavelength is mainly symmetrical to the operating wavelength. On account of the symmetrical course of the reflection spectrum around the operating wavelength, manufacture of the saturable absorber mirror by applying the inventive design is non-critical in terms of fabrication tolerances, e.g. with an epitactical growth of the layers of the interference filter.

Another advantage of the present invention lies in that the cover layer can be applied in a manufacturing process that is separated from the manufacture of the actual mirror which is comprised of a rear-side reflector layer and an interference filter with an absorber layer. In accordance with the invention, it is thus possible to analyze the structure comprised of a rear-side reflector layer and an intermediate layer at first and then to apply a cover layer with the correct thickness corresponding to the desired operating wavelength.

It is an essential feature of the present invention that the interference filter is neither resonant nor anti-resonant. The interference filter may have an arbitrary optical thickness. Adaptation to the operating wavelength is accomplished by a suitable determination of the optical thickness of the cover layer.

Since in accordance with the present invention the interference filter is not anti-resonant, it can be achieved that the intensity of the standing wave field in the interior of the interference filter at the site of the absorber layer is noticeably higher than it is with an anti-resonant layout. Accordingly, in conformity with the present invention, a saturable absorber mirror can be provided which in terms of saturation fluence and modulation depth has better properties than a saturable absorber mirror with anti-resonant design.

In a preferred embodiment of the inventive saturable absorber mirror, it is provided for that the optical thickness of the cover layer is twice as thick as the amount by which the optical thickness of the interference filter falls short of an integer multiple of half the operating wavelength. Encompassed thereby is a (trivial) enhancement or diminution of the optical thickness of the cover layer by integer multiples of half the operating wavelength. Since with the given operating wavelength the interference filter is neither resonant nor anti-resonant, the optical thickness of the interference filter attains an amount that deviates from an integer multiple of half the operating wavelength. It becomes evident that the inventive symmetrization of the reflectivity spectrum can be achieved by determining the optical thickness of the cover layer just twice as thick as the amount by which the optical thickness of the interference filter falls short of an integer multiple of half the operating wavelength. For example, this means that viewed from the rear-side reflector layer, the optical layer of the structure comprised of interference filter and cover layer in the center of the cover layer is equivalent to an integer multiple of $\lambda/2$.

Preference is furthermore given to an embodiment of the inventive saturable absorber mirror in which one or several spaced absorber layer(s) in form of quantum wells is/are arranged inside the interference filter. This corresponds to the usual configuration of saturable absorber mirrors on semiconductor basis (SESAM). In conformity with the invention, such conventional SESAMs are coated with a cover layer, the thickness of which is determined in the manner as described hereinabove.

As an alternative, the absorber layer may be comprised of carbon nanotubes or, for example, of a thin crystal doped with ions.

In accordance with a preferred embodiment of the present invention, the reflector layer is a multiple-layer Bragg mirror as described above. This configuration is suitable for a semiconductor saturable absorber mirror (SESAM). The Bragg mirror may be comprised of a pile of $\lambda/4$ layers composed of semiconductor material with alternating refraction index (e.g. AlAs/GaAs). Likewise it is possible to utilize e.g. a metallic mirror as reflector layer or even a mirror composed of amorphous dielectrics (e.g. silicon oxide, titanium oxide, Hafnium oxide). It is also feasible to choose a reflector layer that offers dispersive properties to compensate for dispersion (e.g. so-called "chirped mirrors").

With the inventive saturable absorber mirror, the cover layer is preferably comprised of a dielectric material that is transparent get the operating wavelength. The refraction index of the cover layer material at least at the boundary areas of the cover layer differs clearly from the refraction indices of the material of the interference filter. For example, a material suitable for the cover layer is an amorphous dielectric like $SiN_x$. The cover layer may also be comprised of a sequence of several transparent layers, e.g. of $TiO_2/SiO_2$. Crystalline cover layers like for example CaF may also be utilized. If the cover layer is intended to serve as protection for the interference filter, then an oxide-free material (e.g. $SiN_x$) lends itself suitable. Such materials prevent a light-supported oxidation of the materials of the absorber mirror and thus they provide for passivating.

Furthermore it may be advantageous to equip the absorber mirror with an additional absorber layer that limits the intensity of the standing wave field. Such a layer can be utilized to provide for a limitation of the pulse energy with lasers for generating short or ultra-short light pulses. Suitable materials for the additional absorber layer are materials in which multiple-photon excitations occur at operating wavelength which provide for absorption at high light intensities.

Figure 2:
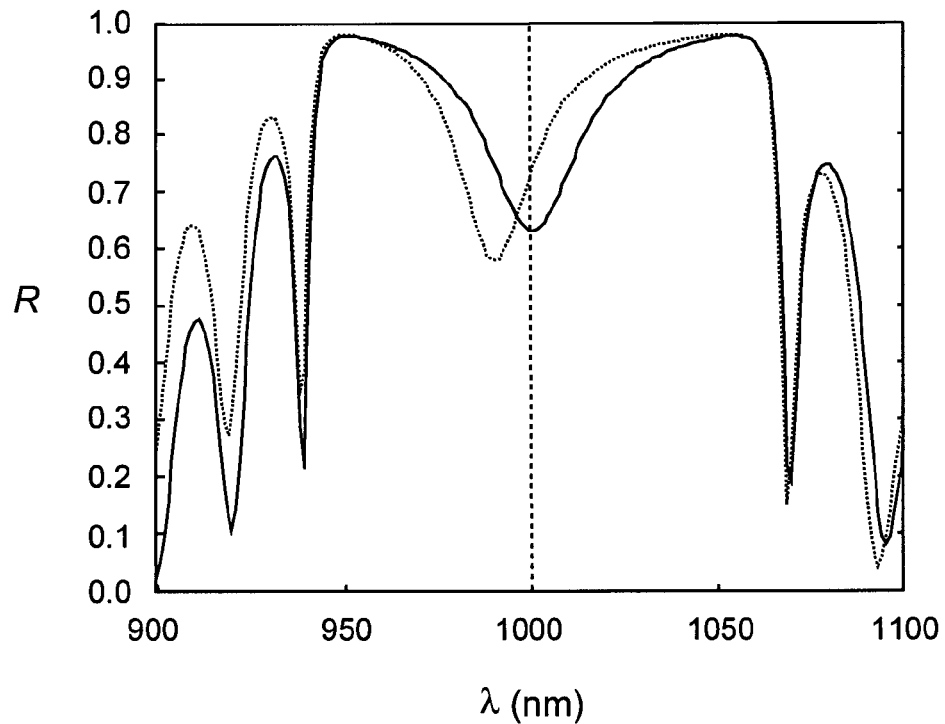
Figure 3:
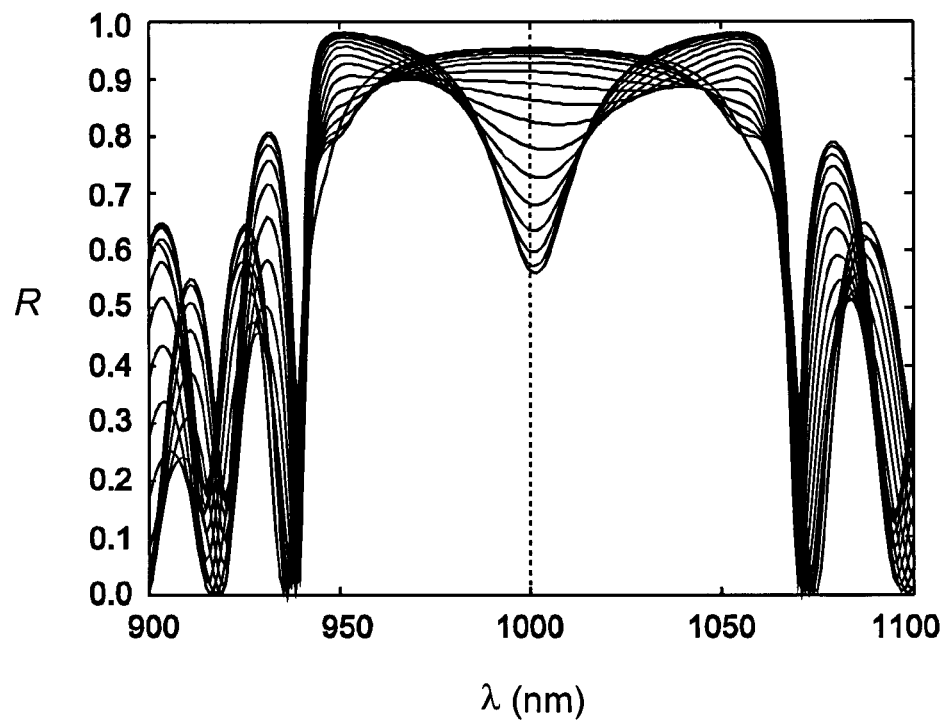

Exemplary embodiments of the present invention are explained and outlined in greater detail based on drawings as set forth below, wherein FIG. 1: shows a sectional view through an inventive saturable absorber mirror to illustrate the layer structure (upper illustration), refraction index n and light intensity I as a function of depth z within the layer structure of the inventive saturable absorber mirror (lower illustration);

FIG. 2: Reflectivity spectrum of the inventive saturable absorber mirror;

FIG. 3: Reflectivity spectrum for interference filters with various optical thicknesses.

FIG. 1 schematically shows an exemplary embodiment of an inventive absorber mirror. The upper diagram illustrates the layer structure of the absorber mirror onto which the light 1 to be reflected is irradiated from the right side. The abscissa of the diagram illustrated in FIG. 1 at the bottom represents the position z (in μm) within the layer structure.

The saturable absorber mirror is comprised of a high-reflective rear-side reflector layer 2. It encompasses several quarter-wave layers 3 and 4 of GaAs and/or AlAs. It is a Bragg mirror. The number of quarter-wave layers 3 and/or 4 in practice is much greater than the one shown in FIG. 1. At its front side, the saturable absorber mirror has a cover layer 5 composed of a transparent dielectric material, viz. $SiN_x$. An intermediate layer 6 is arranged between the rear-side reflector layer 2 and the front-side cover layer 5. The boundary areas of the intermediate layer 6 are determined by the leaps in the course of the refraction index n that can be recognized in the diagram in FIG. 1 at bottom. Thus, the boundary areas form an interference filter, viz. a Fabry-Perot etalon.

Arranged within the intermediate layer are several absorber layers 7 made of a material that absorbs light out an operating wavelength of the saturable absorber mirror depending on intensity. The exemplary embodiment represents quantum wells from InGaAs. Besides, the material of the intermediate layer between the absorber layers 7 is transparent towards the light at operating wavelength (e.g. GaAs). The layer thickness of the quantum wells 7 ranges between 10 and 20 nm.

The diagram in FIG. 1 at bottom shows the intensity I (in arbitrary units) of the stationary wave field of the irradiated light 1 as a dashed line. It can be seen that the absorber layers 7 are mainly situated at the positions of the intensity maximums within the interference filter. This ensures high modulation depth and low saturation fluence.

With the illustrated exemplary embodiment, the intermediate layer, i.e. the interference filter, has an optical thickness of $11.8 \cdot \lambda/4$ (at operating wavelength). Thereof, it results that the interference filter is neither resonant nor anti-resonant. The optical thickness of the interference filter falls short of the next integer multiple of half the operating wavelength by $0.2 \cdot \lambda/4$. According to the invention, the optical thickness of the cover layer 5 is so determined that it is twice as thick as this amount. With the illustrated exemplary embodiment, the optical thickness of cover layer 5 accordingly amounts to $0.4 \cdot \lambda/4$. Thereof, it results that the intensity I of the electromagnetic stationary wave field of the light in the interior of the cover layer 5 has a local extremum 8.

In determining the optical thickness of the cover layer, one may proceed as follows:

Initially a variable x can be determined which results from the arbitrary optical thickness of the interference filter 6 modulo $\lambda/2$ and which is expressed in $\lambda/4$ (at the operating wavelength), i.e. in units of QWOT ("quarter wave optical thickness"):

$$x = \left(\frac{4}{\lambda} \sum_i n_i d_i\right) \bmod 2$$

Accordingly, $n_i d_i$ are the optical thicknesses of the individual layers, with $n_i$ being the refraction index and $d_i$ the geometrical thickness of the layer i. An inventive cover layer with the optical thickness y (in QWOT) results if the following equation is fulfilled:

$$\frac{y}{2} + x = m$$

Accordingly, m is a natural numeral. The geometrical thickness $d_D$ of the cover layer then results from the refraction index of the material of the cover layer $n_D$ at $$d_D = y \cdot \lambda/(4 \cdot n_D).$$

Thereby one can realize that the interference filter (intermediate layer 6) in principle can have any arbitrary thickness; neither resonance nor anti-resonance is required. A suitable thickness of the cover layer can be found for any arbitrary thickness. Hence, the present invention permits applying the cover layer 5 subsequently onto an existing base structure comprised of a rear-side reflector layer 2 and an interference filter (with absorber layers 7). For this purpose it is merely required to analyze the existing layer thicknesses and to determine the optical thickness of cover layer 5 resulting thereof in accordance with the invention in order to provide a saturable absorber mirror for the desired operating wavelength.

It is readily possible to manufacture the cover layer in multiple layers, i.e. of different materials. This must be taken into account when rating the optical thickness of the cover layer. Likewise any phase shifting caused by the rear-side reflector layer 2 must also be taken into account.

Trivially the optical thickness of the cover layer can be enhanced or diminished at any time by an integer multiple of $\lambda/2$ without this leading to a change in the properties that matter in accordance with the present invention.

The diagram in FIG. 2 shows the spectrum of reflectivity of the inventive saturable absorber mirror, i.e. the reflectivity R as a function of $\lambda$. With the exemplary embodiment, the operating wavelength amounts to $\lambda=1000$ nm. The continuous line shows the spectrum of reflectivity of the absorber mirror with an inventive cover layer 5. It can be realized that the reflectivity of the absorber mirror at the given operating wavelength amounts to approx. 0.65, with the course of reflectivity depending on the light wavelength $\lambda$ mainly being symmetrical to the operating wavelength. Without the inventive cover layer, the spectrum of reflectivity (dotted line) takes a course that is markedly shifted as compared with the operating wavelength $\lambda=1000$ nm. Besides, the spectrum without a cover layer is configured asymmetrically. Thereby it becomes evident that fabrication-related variations in the thickness of the Fabry-Perot etalon (intermediate layer 6) can be offset very practicably by a cover layer rated in accordance with the present invention.

The diagram in FIG. 3 shows several reflectivity spectra, viz. spectra of inventive saturable absorber mirrors with differently thick Fabry-Perot etalons. Shown here are spectra for 16 different values of x (see above) between 0 and 1. It can be realized that independently of the actual resonance wavelength of the interference filter, a thickness for the front-side cover layer can be found, thus resulting in a nearly symmetrical course of the reflectivity spectrum around the operating wavelength $\lambda=1000$ nm. Accordingly, the reflectivity R at the operating wavelength $\lambda=1000$ nm varies between 0.55 and 0.95. A further optimization in the symmetry of reflectivity spectra can be achieved, for example, by a suitable multiple-layer structure of the cover layer in the sense of the present invention.

The invention claimed is:

1. Saturable absorber mirror comprised of a) a rear-side reflector layer (2), b) an intermediate layer (6), the boundary areas of which form an interference filter, c) at least one absorber layer (7) arranged within the interference filter and made of a material absorbing light at operating wavelength of the saturable absorber mirror depending on intensity, and e) a front-side cover layer (5), characterized in that the interference filter is neither resonant nor anti-resonant at the operating wavelength, with the intensity (1) of the electromagnetic stationary wave field of the light (1) in the interior of the cover layer (5) having a local extremum (8).

2. Saturable absorber mirror according to claim 1, characterized in that the thickness of the cover layer (5) is so determined that the course of the reflectivity (R) depending on the light wavelength ($\lambda$) is essentially symmetrical to the operating wavelength.

3. Saturable absorber mirror according to claim 1, characterized in that the optical thickness of the cover layer (5) is twice as thick as the amount by which the optical thickness of the interference filter falls short of an integer multiple of half the operating wavelength.

4. Saturable absorber mirror according to claim 1, characterized in that one or several spaced absorber layers (7) are arranged in form of quantum wells within the interference filter.

5. Saturable absorber mirror according to claim 1, characterized in that the absorber layer (7) contains carbon nanotubes.

6. Saturable absorber mirror according to claim 1, characterized in that the absorber layer (7) is a crystal doped with ions.

7. Saturable absorber mirror according to claim 1, characterized in that the reflector layer (2) is a multiple-layer Bragg mirror.

8. Saturable absorber mirror according to claim 1, characterized in that the reflector layer (2) is configured as a metallic mirror.

9. Saturable absorber mirror according to claim 1, characterized in that the reflector layer (2) has dispersive properties.

10. Saturable absorber mirror according to claim 1, characterized in that the cover layer (5) is comprised of a dielectric material being transparent at the operating wavelength.

11. Saturable absorber mirror according to claim 10, characterized in that the material of the cover layer (5) is $SIN_x$, $SiO_2$, $TiO_2$ or CaF.

12. Saturable absorber mirror according to claim 1, characterized in that the cover layer (5) is comprised of a multiple-layer structure.

13. Saturable absorber mirror according to claim 1, characterized by an absorber layer limiting the intensity of the stationary wave field.

14. Method for adapting a saturable absorber mirror to a pre-defined operating wavelength, comprising the steps of:
providing the saturable absorber mirror comprised of
a) a rear-side reflector layer,
b) an intermediate layer), the boundary areas of which neither form a resonant nor an anti-resonant interference filter at operating wavelength, and
c) at least one absorber layer arranged within the interference filter and made of a material absorbing light at operating wavelength of the saturable absorber mirror depending on intensity,
coating the saturable absorber material at its front side with a cover layer being transparent at operating wavelength, wherein the thickness of the cover layer is so determined that the course of the reflectivity depending on the light wavelength is mainly symmetrically to the operating wavelength.

15. Method according to claim 14, characterized in that the thickness of the cover layer (5) is so determined that its optical thickness is mainly twice as thick as the amount by which the optical thickness of the interference filter falls is short of an integer multiple of half the operating wavelength.

16. Method according to claim 14 to provide a mode coupling element in a laser to generate light pulses.

17. Method according to claim 14 to provide a regeneration filter for regeneration of optical signals transmitted via optical signal lines.

* * * * *